United States Patent
Son et al.

(10) Patent No.: US 11,499,010 B2
(45) Date of Patent: Nov. 15, 2022

(54) POLYCARBONATE AND PREPARATION METHOD THEREOF

(71) Applicant: LG CHEM, LTD., Seoul (KR)

(72) Inventors: Youngwook Son, Daejeon (KR); Young In Yang, Daejeon (KR); Ki Jae Lee, Daejeon (KR); Mooho Hong, Daejeon (KR); Byoungkue Jeon, Daejeon (KR); Young Young Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 75 days.

(21) Appl. No.: 15/734,954

(22) PCT Filed: Aug. 9, 2019

(86) PCT No.: PCT/KR2019/010134
§ 371 (c)(1),
(2) Date: Dec. 3, 2020

(87) PCT Pub. No.: WO2020/032723
PCT Pub. Date: Feb. 13, 2020

(65) Prior Publication Data
US 2021/0230360 A1 Jul. 29, 2021

(30) Foreign Application Priority Data

Aug. 10, 2018 (KR) .......... 10-2018-0093982
Aug. 8, 2019 (KR) .......... 10-2019-0096975

(51) Int. Cl.
*C08G 64/08* (2006.01)
*C08G 64/30* (2006.01)

(52) U.S. Cl.
CPC ......... *C08G 64/305* (2013.01); *C08G 64/081* (2013.01)

(58) Field of Classification Search
USPC ................................. 528/272, 274
See application file for complete search history.

(56) References Cited

U.S. PATENT DOCUMENTS

| | | | |
|---|---|---|---|
| 4,927,903 A | 5/1990 | Schreckenberg et al. | |
| 6,448,365 B1 | 9/2002 | Funakoshi et al. | |
| 6,462,165 B1 | 10/2002 | Ito et al. | |
| 2008/0287610 A1 | 11/2008 | Ishikawa et al. | |
| 2008/0300378 A1 | 12/2008 | Suga et al. | |
| 2010/0010135 A1 | 1/2010 | Brand et al. | |
| 2012/0226258 A1 | 9/2012 | Otto et al. | |
| 2015/0376447 A1 | 12/2015 | Kawabe et al. | |
| 2016/0272759 A1 | 9/2016 | Park et al. | |
| 2017/0283547 A1 | 10/2017 | Ko et al. | |
| 2017/0298221 A1 | 10/2017 | Son et al. | |
| 2020/0148818 A1 | 5/2020 | Jeon et al. | |

FOREIGN PATENT DOCUMENTS

| | | |
|---|---|---|
| CN | 1455301 | 11/2003 |
| CN | 101805506 | 8/2010 |
| CN | 101805507 | 8/2010 |
| CN | 101838452 | 9/2010 |
| CN | 101845214 | 9/2010 |
| CN | 101864157 | 10/2010 |
| CN | 102898630 | 1/2013 |
| CN | 103044893 | 4/2013 |
| CN | 103059544 | 4/2013 |
| CN | 103265802 | 8/2013 |
| CN | 103275475 | 9/2013 |
| CN | 103304978 | 9/2013 |
| CN | 103351595 | 10/2013 |
| CN | 103554863 | 2/2014 |
| CN | 103724962 | 4/2014 |
| CN | 104650566 | 5/2015 |
| CN | 105017698 | 11/2015 |
| DE | 102009037015 | 2/2011 |
| EP | 0464351 A2 | 1/1992 |
| EP | 2857384 A1 | 4/2015 |
| JP | S60-050820 B2 | 11/1985 |
| JP | H01-210422 A | 8/1989 |
| JP | H04-249529 A | 9/1992 |
| JP | 2000-186137 | 7/2000 |
| JP | 2005-247947 | 9/2005 |
| JP | 2009-280679 | 12/2009 |
| JP | 5503869 | 5/2014 |

(Continued)

OTHER PUBLICATIONS

WO2012073970A1 Machine Translation Inventor: Morishita, H.4 Jun. 7, 2012 Polycarbonate resin coating fluid and uses thereof (Year: 2012).*

(Continued)

*Primary Examiner* — Terressa Boykin
(74) *Attorney, Agent, or Firm* — Dentons US LLP

(57) ABSTRACT

Provided is a polycarbonate of Chemical Formula 1:

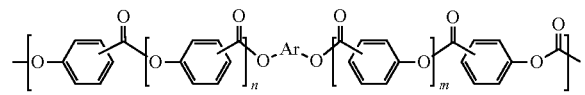

wherein in Chemical Formula 1:

Ar is $C_{6-60}$ arylene unsubstituted or substituted with $C_{1-10}$ alkyl; and n and m are each independently an integer from 1 to 50, provided that n+m is 2 or more, and a preparation method thereof.

11 Claims, 6 Drawing Sheets

(56) References Cited

FOREIGN PATENT DOCUMENTS

| | | |
|---|---|---|
| JP | 2020-521025 A | 7/2020 |
| KR | 10-2002-0006047 | 1/2002 |
| KR | 10-2007-0036091 | 4/2007 |
| KR | 10-2016-0002401 | 1/2016 |
| KR | 10-2016-0004501 | 1/2016 |
| KR | 10-2016-0010939 | 1/2016 |
| KR | 10-1758962 | 1/2016 |
| KR | 10-2016-0026062 | 3/2016 |
| KR | 10-2016-0067800 | 6/2016 |
| KR | 10-1856329 | 5/2018 |
| KR | 10-2018-0079065 | 7/2018 |
| KR | 10-2020-0026141 A | 3/2020 |
| WO | 2001-012521 | 2/2001 |
| WO | 2010-026069 | 3/2010 |
| WO | 2012-073970 | 6/2012 |
| WO | WO-2012073970 A1 * | 6/2012 ............ C08G 64/06 |
| WO | 2015-002429 | 1/2015 |

OTHER PUBLICATIONS

Extended Search Report of European Patent Office in Appl'n No. 19847949.5, dated May 14, 2021.

* cited by examiner

POLYCARBONATE AND PREPARATION METHOD THEREOF

CROSS-REFERENCE TO RELATED APPLICATIONS

This application is a National Stage Application of International Application No. PCT/KR2019/010134 filed on Aug. 9, 2019, which claims priority to Korean Patent Applications No. 10-2018-0093982 filed on Aug. 10, 2018 and No. 10-2019-0096975 filed on Aug. 8, 2019 with the Korean Intellectual Property Office, the disclosures of which are incorporated herein by reference in their entirety.

BACKGROUND OF THE INVENTION

(a) Field of the Invention

The present disclosure relates to a polycarbonate and a preparation method thereof. More particularly, the present disclosure relates to the polycarbonate and the preparation method thereof, which has a novel structure with an improvement in weather resistance, while having excellent mechanical properties.

(b) Description of the Related Art

A polycarbonate resin is a polymer material, which has been used in various fields such as exterior materials of electrical and electronic equipment, automobile parts, construction materials, optical components, etc., due to its physical properties such as excellent impact strength, dimensional stability, heat resistance, transparency and the like.

With a recent expansion of this polycarbonate resin into more application fields such as glass and lens, there is a demand for developing a polycarbonate with a novel structure, which has an improvement in weather resistance, refractive index and the like, while maintaining physical properties inherent in the polycarbonate resin.

Accordingly, attempts have been made in research into introducing monomers with different structures into a main chain of polycarbonate by copolymerizing two or more aromatic diols with different structures, and thus obtaining desired physical properties. However, most of the technologies have their limits in that the production cost is high, and an increase in chemical resistance, impact strength or the like leads to a decrease in transparency, while a rise in transparency results in a decline in chemical resistance, impact strength or the like.

Therefore, there is still a need for research and development on the polycarbonate with a novel structure, which has great weather resistance, while having excellent mechanical properties such as hardness, etc., at the same time.

SUMMARY OF THE INVENTION

The present disclosure is to provide a polycarbonate and a preparation method thereof, which has great weather resistance, while having excellent mechanical properties.

The present disclosure provides a polycarbonate, including a repeating unit of Chemical Formula 1.

Also, the present disclosure provides a preparation method of the polycarbonate, including a step of polymerizing a composition containing a compound of Chemical Formula 3, and a carbonate precursor.

Moreover, the present disclosure provides a molded article comprising the polycarbonate.

Hereinafter, the polycarbonate, the preparation method thereof, and the molded article will be described in more detail according to specific exemplary embodiments of the disclosure.

According to one exemplary embodiment of the disclosure, there is provided a polycarbonate, including a repeating unit of the following Chemical Formula 1:

Chemical Formula 1

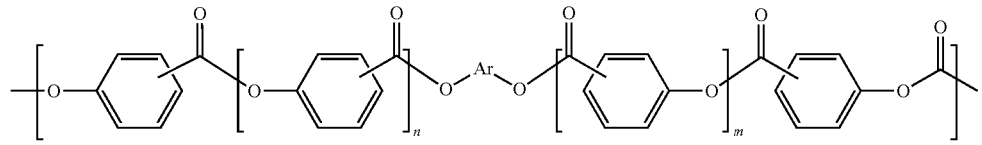

wherein in Chemical Formula 1:

Ar is $C_{6-60}$ arylene unsubstituted or substituted with $C_{1-10}$ alkyl; and n and m are each independently an integer from 1 to 50, provided that n+m is 2 or more.

The polycarbonate can exhibit excellent weather resistance together with polymerization stability by including a repeating unit derived from an oligomer having various arylene groups linked to ester groups on both sides.

More particularly, the repeating unit of the Chemical Formula 1, which forms the polycarbonate of the present disclosure, includes a structure having hydroxybenzoate and various arylene groups linked to each other, and can exhibit a more desirable effect of weather resistance than existing polycarbonates due to a structural change caused by a fries-rearrangement reaction of the ester group of hydroxybenzoate, and can further increase an effect of improving weather resistance of the polycarbonate depending on a content (n, m) of the hydroxybenzoate repeating unit included in the structure of the Chemical Formula 1 as well as structural isomers.

In the present specification, the arylene having 6 to 60 carbon atoms can be a monocyclic arylene group or a polycyclic arylene group. Particularly, the arylene having 6 to 60 carbon atoms can be a monocyclic or polycyclic arylene having 6 to 30 carbon atoms or a monocyclic or polycyclic arylene having 6 to 20 carbon atoms. More particularly, the arylene having 6 to 60 carbon atoms can be a divalent group derived from an aromatic hydrocarbon such as benzene, biphenyl, diphenyl methane, diphenyl propane, terphenyl or the like, as a monocyclic arylene, and can be a divalent group derived from an aromatic hydrocarbon such as naphthalene, anthracene, phenanthrene, triphenylene, pyrene, perylene, chrysene, fluorene or the like, as a polycyclic arylene, but is not limited thereto. Also, the arylene having 6 to 60 carbon atoms can be unsubstituted or substituted with an alkyl group having 1 to 10 carbon atoms.

In the present specification, fluorene can be substituted, or can form a spiro structure in such a way that two substituents bind to each other. When the fluorene is substituted, the fluorene can be

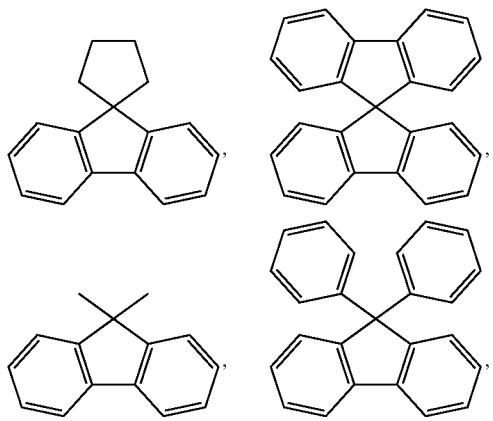

etc., but is not limited thereto.

In the present specification, the alkyl group can be a linear or branched alkyl group having 1 to 10 carbon atoms or 1 to 5 carbon atoms. Specific examples of the alkyl group are methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, etc., but are not limited thereto.

According to one embodiment of the present disclosure, in Chemical Formula 1, each of n and m can be an integer of 0 or more, 1 or more, 2 or more, or 3 or more, and can be an integer of 50 or less, 20 or less, 15 or less, or 10 or less. The n and m can be 2 or more, or 3 or more to improve weather resistance.

Also, in the Chemical Formula 1, the Ar can be

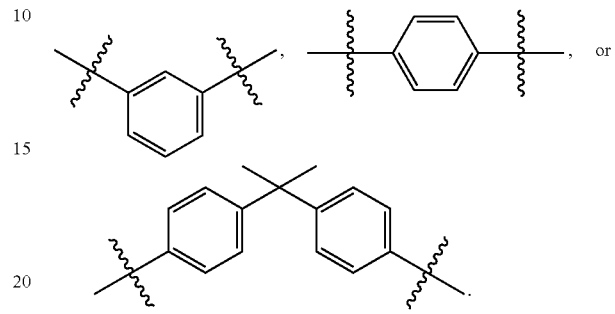

Specific examples of the repeating unit of Chemical Formula 1, can be compounds of the following Chemical Formulae 1a to 1c, but the present disclosure is not limited thereto:

Chemical Formula 1a

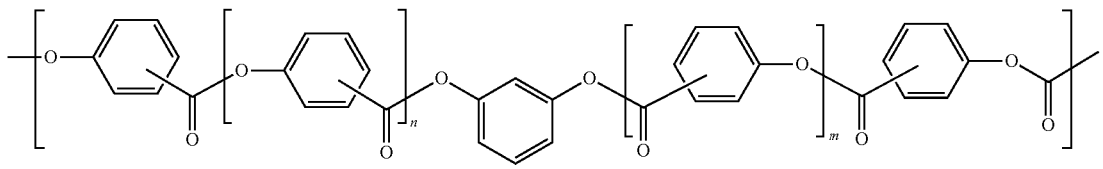

Chemical Formula 1b

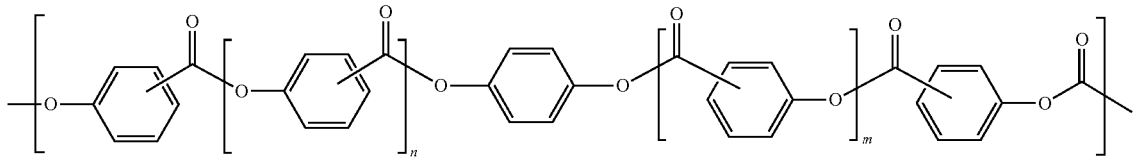

Chemical Formula 1c

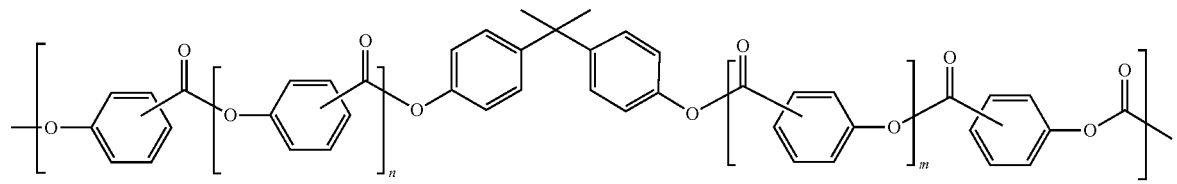

wherein in Chemical Formulae 1a to 1c, n and m are as defined in Chemical Formula 1.

The polycarbonate of the present disclosure can be formed only with the repeating unit of Chemical Formula 1. Alternatively, such polycarbonate can further include a repeating unit derived from other aromatic diol compounds in addition to the repeating unit of Chemical Formula 1.

According to one exemplary embodiment, the polycarbonate of the present disclosure can include the repeating unit of Chemical Formula 1 and a repeating unit of the following Chemical Formula 2:

Chemical Formula 2

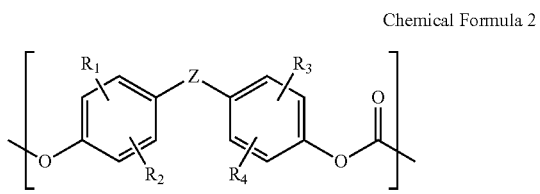

wherein in Chemical Formula 2:

$R_1$ to $R_4$ are each independently hydrogen, $C_{1-10}$ alkyl, $C_{1-10}$ alkoxy, or halogen; and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In Chemical Formula 2, $R_1$ to $R_4$ are each independently hydrogen, or $C_{1-4}$ alkyl. Preferably, the $R_1$ to $R_4$ can be each independently hydrogen, methyl, chloro, or bromo.

Also, in Chemical Formula 2, Z is each independently linear or branched $C_{1-10}$ alkylene unsubstituted or substituted with phenyl, and more preferably can be methylene, ethane-1,1-diyl, propane-2,2-diyl, butane-2,2-diyl, 1-phenylethane-1,1-diyl, or diphenylmethylene.

The repeating unit of Chemical Formula 1 is characterized by excellent refractive index, fluidity and weather resistance, while the repeating unit of Chemical Formula 2 is characterized by excellent transparency and impact resistance. Accordingly, a weight ratio of the repeating units of Chemical Formulae 1 and 2 can be adjusted to prepare a polycarbonate with desired physical properties.

When the polycarbonate of the present disclosure further includes the repeating unit of Chemical Formula 2 in addition to the repeating unit of Chemical Formula 1, a weight ratio thereof is not particularly limited. For example, the weight ratio of the repeating unit of Chemical Formula 1 and the repeating unit of Chemical Formula 2 can be 99:1 to 1:99.

In particular, when the weight ratio of the repeating unit of Chemical Formula 1 and the repeating unit of Chemical Formula 2 is 5:95 to 40:60, more preferably 10:90 to 30:70, the polycarbonate can exhibit excellent weather resistance and high fluidity.

A weight average molecular weight (Mw) of the polycarbonate can be adjusted appropriately for its purposes and uses, and the weight average molecular weight can be from 15,000 g/mol or more, 30,000 g/mol or more, or 40,000 g/mol or more, to 70,000 g/mol or less, 60,000 g/mol or less, or 50,000 g/mol or less, when measured by a gel permeation chromatograph (GPC) and calibrated using standard polystyrene (PS Standard).

Also, a melt index of the polycarbonate, which is measured in accordance with ASTM D1238 (300° C., 1.2 kg condition), can be adjusted appropriately for its purposes and uses. For example, the polycarbonate can exhibit high fluidity with a melt index from 8 g/10 min or more, 9 g/10 min or more, 10 g/10 min or more, 11 g/10 min or more, 12 g/10 min or more, or 13 g/10 min or more, to 120 g/10 min or less, 80 g/10 min or less, 45 g/10 min or less, 25 g/10 min or less, 23 g/10 min or less, or 21 g/10 min or less.

Furthermore, a weather resistance index (ΔE) of the polycarbonate of the present disclosure, which is calculated by measuring L, a, and b values of a specimen in accordance with ASTM D7869 and measuring L', a' and b' values again after leaving the specimen in 2250 hr weathering condition with Weather-Ometer® machine, can be 15 or less, and preferably 12 or less, 10 or less, 9 or less, or 8 or less. The lower weather resistance can be evaluated as the better. Thus, a lower limit thereof is not particularly limited, but can be, for example, 1 or more, 3 or more, or 4 or more.

Meanwhile, according to another exemplary embodiment of the present disclosure, there can be provided a preparation method of the polycarbonate, including a step of polymerizing a composition containing a compound of following Chemical Formula 3 and a carbonate precursor:

Chemical Formula 3

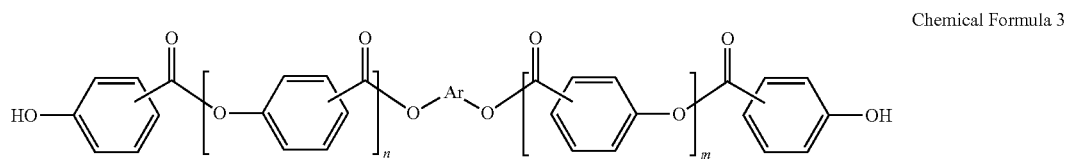

wherein in Chemical Formula 3:

Ar is $C_{6-60}$ arylene unsubstituted or substituted with $C_{1-10}$ alkyl; and n and m are each independently an integer from 1 to 50, provided that n+m is 2 or more.

According to one embodiment of the present disclosure, in Chemical Formula 3, each of n and m can be an integer of 0 or more, 1 or more, 2 or more, or 3 or more, and can be an integer of 50 or less, 20 or less, 15 or less, or 10 or less. The n and m can be 2 or more, or 3 or more to improve weather resistance.

According to one embodiment of the present disclosure, a weight average molecular weight of the compound of the Chemical Formula 3 can be adjusted appropriately for its purposes and uses, and the weight average molecular weight can be from 200 g/mol or more, 500 g/mol or more, or 1,000 g/mol or more, to 5,000 g/mol or less, 3,000 g/mol or less, or 2,000 g/mol or less, when measured by a gel permeation chromatograph (GPC) and calibrated using standard polystyrene (PS Standard).

As a specific example of the compound of Chemical Formula 3, there can be compounds of the following Chemical Formulae 3a to 3c, but the present disclosure is not limited thereto:

Chemical Formula 3a

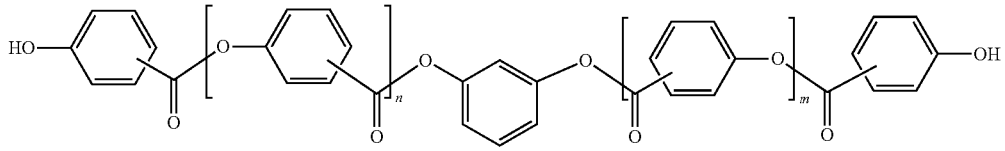

Chemical Formula 3b

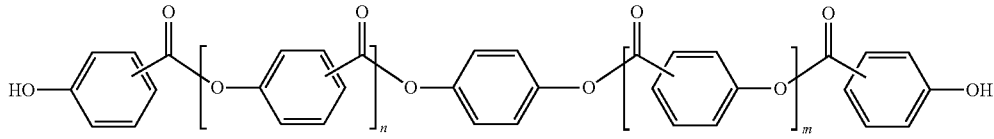

Chemical Formula 3c

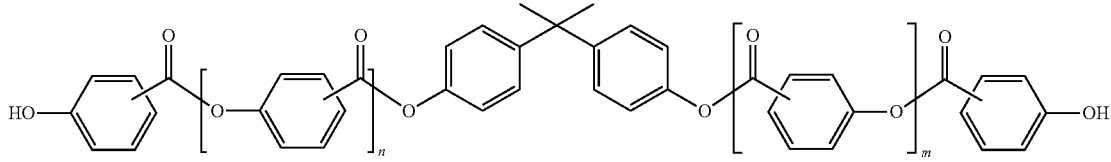

wherein in Chemical Formulae 3a to 3c, n and m are as defined in Chemical Formula 3.

The compound of Chemical Formula 3 can be synthesized by an esterification reaction according to the following Reaction Formula 1, with reference to more specific details in the after-mentioned embodiments:

Reaction Formula 1

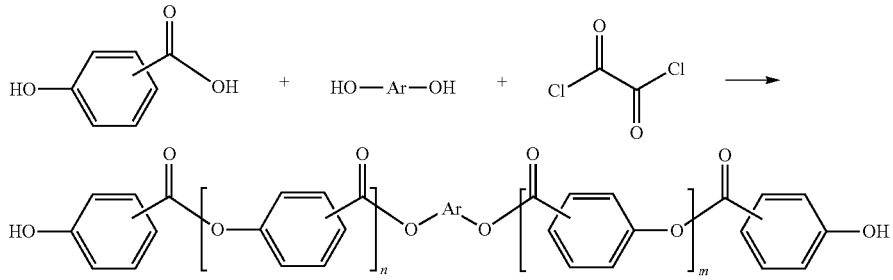

wherein in the above Reaction Formula 1, Ar, n and m are as defined in Chemical Formula 3.

According to one embodiment of the present disclosure, such compound can be polymerized by further reacting an aromatic diol compound of the following Chemical Formula 4:

Chemical Formula 4

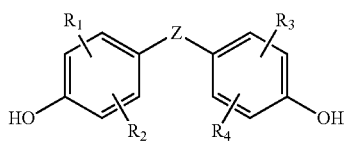

wherein in Chemical Formula 4:

$R_1$ to $R_4$ are each independently hydrogen, $C_{1-10}$ alkyl, $C_{1-10}$ alkoxy, or halogen; and Z is a $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

A specific example of the aromatic diol compound of Chemical Formula 4, can be a compound selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, and 1,1-bis(4-hydroxyphenyl)-1-phenylethane.

Also, the carbonate precursor serves to link the compound of Chemical Formula 3 and the compound of Chemical Formula 4 to each other. A specific example thereof can be phosgene, triphosgene, diphosgene, bromophosgene, dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthylcarbonate, bis(diphenyl) carbonate or bishaloformate.

If the composition contains only the compound of Chemical Formula 3 and the carbonate precursor as a monomer, the compound of Chemical Formula 3 can be used in an amount from 1 wt % or more, 10 wt % or more, or 20 wt % or more, to 97 wt % or less, 60 wt % or less, or 40% or less based on 100 wt % of the composition.

Also, the carbonate precursor can be used in an amount from 3 wt % or more, 5 wt % or more, or 10 wt % or more, to 20 wt % or less, 15 wt % or less, or 13% or less based on 100 wt % of the composition.

Meanwhile, during the polymerization, if the composition contains the compound of Chemical Formula 3, the aromatic diol compound of Chemical Formula 4, and the carbonate precursor as a monomer, the compound of Chemical Formula 3 can be used in an amount from 1 wt % or more, 10 wt % or more, or 20 wt % or more, to 96 wt % or less, 60 wt % or less, or 40% or less based on 100 wt % of the composition.

Also, the aromatic diol compound of Chemical Formula 4 can be used in an amount from 1 wt % or more, 30 wt % or more, or 50 wt % or more, to 96 wt % or less, 90 wt % or less, or 80% or less based on 100 wt % of the composition.

Moreover, the carbonate precursor can be used in an amount from 3 wt % or more, 5 wt % or more, or 10 wt % or more, to 20 wt % or less, 15 wt % or less, or 12% or less based on 100 wt % of the composition.

At this time, it is preferable that the polymerization is performed as an interfacial polymerization. During the interfacial polymerization, a polymerization reaction is possible and a molecular weight is easily adjusted at atmospheric pressure and low temperatures.

It is preferable that the polymerization temperature is 0° C. to 40° C. and a reaction time is 10 minutes to 5 hours. Also, it is preferable that pH is maintained at 9 or more, or 11 or more during the reaction.

Any solvent can be used in the polymerization without particular limitation, as long as such solvent is used in the polymerization of the polycarbonate in the art. As an example, halogenated hydrocarbons such as methylene chloride, chlorobenzene, etc., can be used.

Also, it is preferable that the polymerization is performed in the presence of an acid binder. As the acid binder, the following can be used: alkali metal hydroxides such as sodium hydroxide, potassium hydroxide, etc.; or amine compounds such as pyridine, etc.

Moreover, it is preferable that polymerization is performed in the presence of a molecular weight modifier, in order to control a molecular weight of the polycarbonate during the polymerization. As the molecular weight modifier, $C_{1-20}$ alkylphenol can be used. A specific example thereof can be p-tert-butylphenol, p-cumylphenol, decylphenol, dodecylphenol, tetradecylphenol, hexadecylphenol, octadecylphenol, eicosylphenol, docosylphenol or triacontylphenol. The molecular weight modifier can be added thereto before, during or after initiation of the polymerization. The molecular weight modifier can be present in an amount from 0.01 to 10 parts by weight, preferably 0.1 to 6 parts by weight, per 100 parts by weight of the aromatic diol compound, and a desired molecular weight can be obtained within that range.

Also, reaction accelerators such as tertiary amine compounds, quaternary ammonium compounds, quaternary phosphonium compounds, etc., for example, triethylamine, tetra-n-butylammonium bromide, tetra-n-butylphosphonium bromide, etc., can be further used in order to speed up the polymerization reactions.

According to another exemplary embodiment of the present disclosure, there can be provided a molded article including the polycarbonate. As described above, the polycarbonate including the repeating unit of Chemical Formula 1 has also an improvement in weather resistance, while having excellent mechanical properties, and thus has wider application fields compared to molded articles including existing polycarbonates. The molar ratio of repeating units of Chemical Formulae 1 and 2 can be adjusted, thereby preparing the polycarbonate with desired physical properties.

In addition to the polycarbonate according to the present disclosure, the molded article can contain at least one selected from the group consisting of antioxidants, plasticizers, antistatic agents, nucleating agents, flame retardants, lubricants, impact modifiers, fluorescence brightening agents, ultraviolet ray absorbents, pigments and dyes, if necessary.

As one example of a preparation method of the molded article, there can be included a step of thoroughly mixing the inventive polycarbonate and other additives with a mixer, then performing extrusion molding with an extruding machine to manufacture pellets, then drying the pellets, and then performing injection with an injection molding machine.

According to the present disclosure, there can be provided a polycarbonate and a preparation method thereof, which has a novel structure with an improvement in weather resistance, while having excellent mechanical properties.

DETAILED DESCRIPTION OF THE EMBODIMENTS

The present disclosure will be described in more detail through the following embodiments. However, the following embodiments are provided only for the purpose of illustrating the present disclosure, and thus the present disclosure is not limited thereto.

EXAMPLES

Preparation of Polycarbonate

Example 1

(1) Preparation of resorcinol 3-HB (1,3-phenylene bis(3-hydroxybenzoate) oligomer)

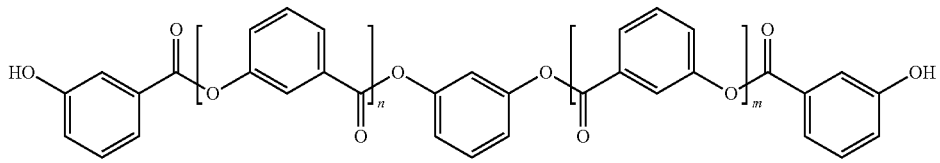

5 g of resorcinol was added dropwise to 200 ml of methylene chloride solvent in a round flask, after which 25.1 g of 1,3-hydroxybenzoic acid was added dropwise thereto. Thereafter, 23 g of oxalyl chloride and 0.01 g of DMF were added dropwise thereto at room temperature, and stirred at room temperature for about 4 hours. The solvent was removed using a rotary evaporator under reduced pressure to obtain a 1,3-phenylene bis(3-hydroxybenzoate) oligomer.

In addition, the obtained 1,3-phenylene bis(3-hydroxybenzoate) oligomer was subjected to an acid-base work-up process using 1N NaOH, 1N HCl aqueous solution, and methylene chloride solvent, and then a 1,3-phenylene bis(3-hydroxybenzoate) oligomer (weight average molecular weight: 780 g/mol) was obtained with a crude yield of 95% without any other purification.

Figure 1:
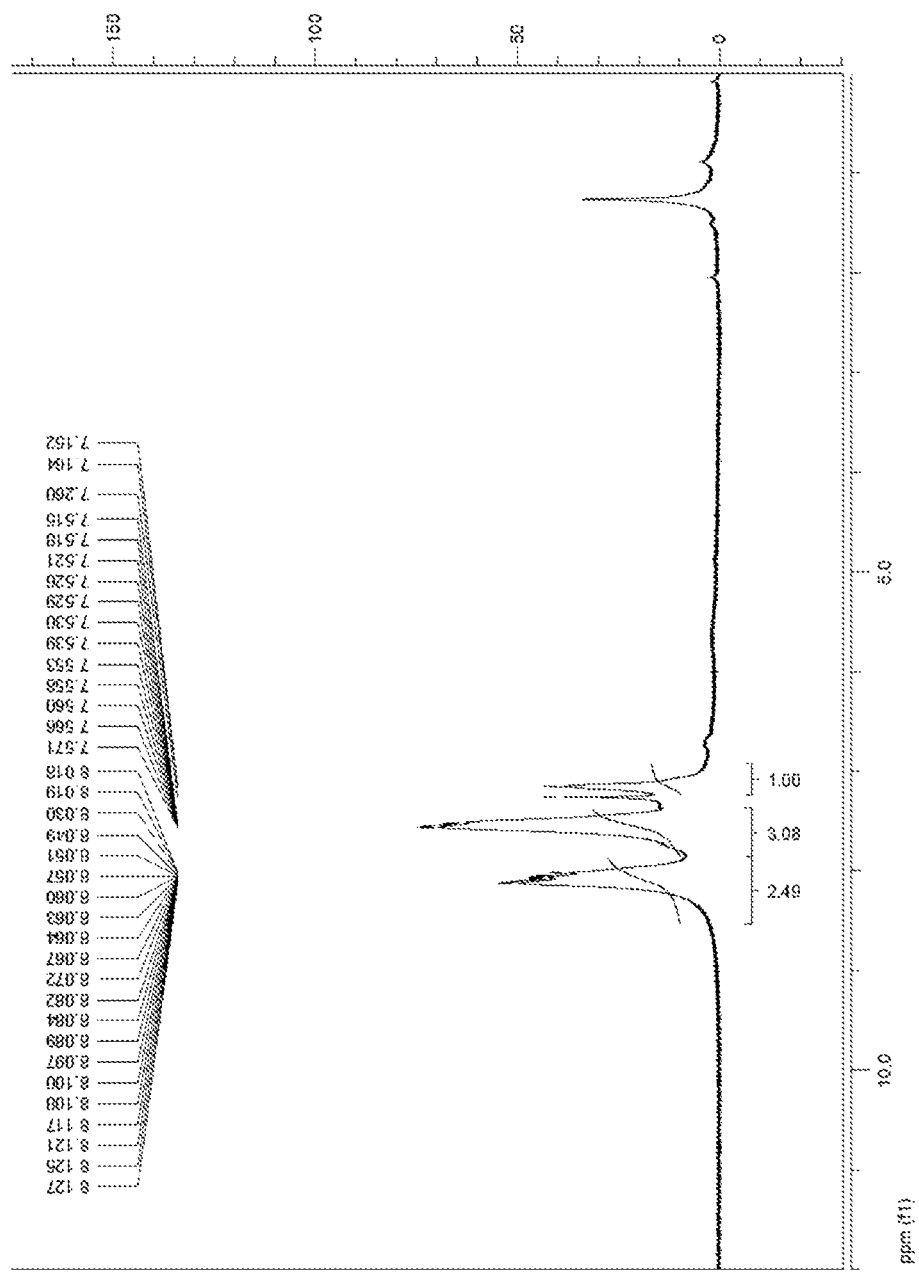
FIG. 1 is a $^1$H-NMR graph of the compound prepared in Example 1.

$^1$H NMR (in $CDCl_3$) analysis was performed on the obtained 1,3-phenylene bis(3-hydroxybenzoate) oligomer (n+m=6), and the result is shown in FIG. 1.

(2) Preparation of Polycarbonate Resin 620 g of water, 112.61 g of BPA, 11.27 g of the 1,3-phenylene bis(3-hydroxybenzoate) oligomer prepared in (1) above, 102.5 g of 40 wt % NaOH aqueous solution, and 200 ml of $MeCl_2$ were put into a 2 L main reactor which is equipped with a nitrogen purge and a condenser and kept at room temperature with a circulator, and then stirred for minutes.

After stopping nitrogen purging, 62 g of triphosgene and 120 g of $MeCl_2$ were put into a 1 L round-bottom flask to dissolve triphosgene therein, after which a resulting dissolved triphosgene solution was slowly put into the main reactor, in which BPA and the 1,3-phenylene bis(3-hydroxybenzoate) oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, a reaction pH was maintained at 11-13.

A resulting mixture was left alone for a while to fully carry out a reaction, after which HCl was added thereto to finish the reaction, such that the pH was dropped to 3-4. Then, agitation was stopped, after which a polymer layer and a water layer were separated from each other, such that a rinsing process was performed repeatedly three to five times by removing the water layer therefrom and adding thereto pure $H_2O$ again.

When rinsing was completely done, only the polymer layer was extracted therefrom, after which a polymer crystal was obtained via reprecipitation by using non-solvents such as methanol, $H_2O$, etc. At this time, a weight average molecular weight of the polycarbonate prepared was 46,000 g/mol. As a result of NMR analysis, it was identified that the repeating unit derived from the 1,3-phenylene bis(3-hydroxybenzoate) oligomer is included in an amount of 10 wt % based on a total weight of the repeating units.

Example 2

A polycarbonate was prepared in the same manner as in Example 1, except that 5.7 g of 1,3-phenylene bis(3-hydroxybenzoate) oligomer and 114.51 g of BPA were used. As a result of NMR analysis, it was identified that the repeating unit derived from the 1,3-phenylene bis(3-hydroxybenzoate) oligomer is included in an amount of 30 wt % based on a total weight of the repeating units.

Example 3

(2) Preparation of hydroquinone 3-HB (1,4-phenylene bis(3-hydroxybenzoate) Oligomer)

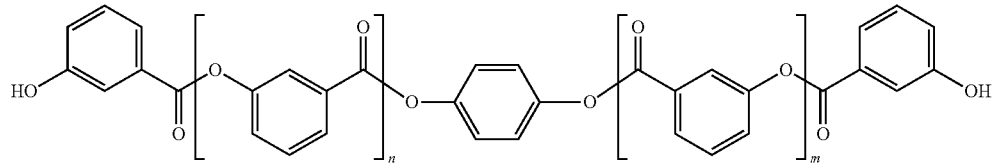

5 g of hydroquinone was added dropwise to 200 ml of methylene chloride solvent in a round flask, after which 25.1 g of 1,3-hydroxybenzoic acid was added dropwise thereto. Thereafter, 23 g of oxalyl chloride and 0.01 g of DMF were added dropwise thereto at room temperature, and stirred at room temperature for about 4 hours. The solvent was removed using a rotary evaporator under reduced pressure to obtain a 1,4-phenylene bis(3-hydroxybenzoate) oligomer.

In addition, the obtained 1,4-phenylene bis(3-hydroxybenzoate) oligomer was subjected to an acid-base work-up process using 1N NaOH, 1N HCl aqueous solution, and methylene chloride solvent, and then a 1,4-phenylene bis(3-hydroxybenzoate) oligomer (weight average molecular weight: 1,100 g/mol) was obtained with a crude yield of 93% without any other purification.

Figure 2:
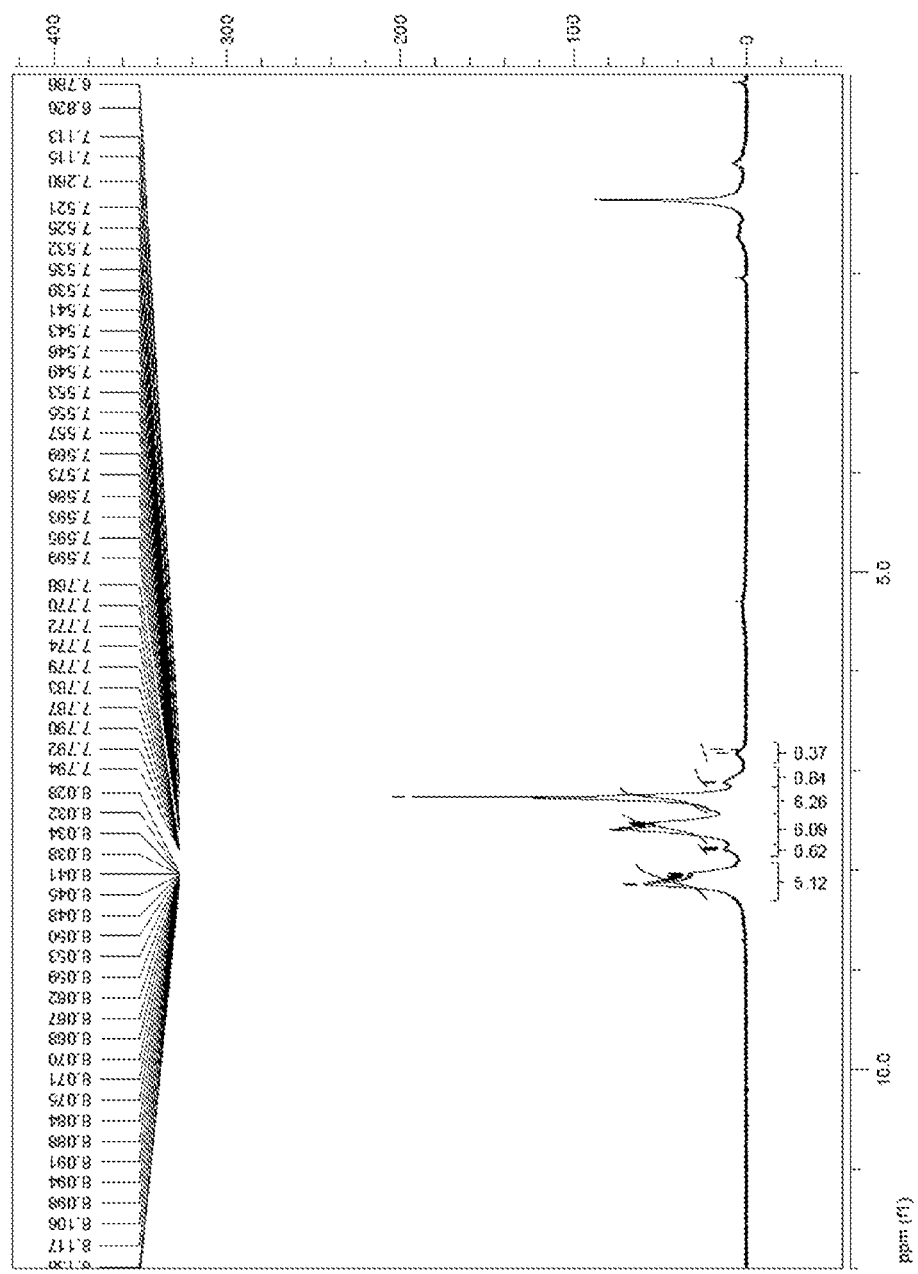
FIG. 2 is a $^1$H-NMR graph of the compound prepared in Example 3.

$^1$H NMR (in Acetone-d6) analysis was performed on the obtained 1,4-phenylene bis(3-hydroxybenzoate) oligomer (n+m=10), and the result is shown in FIG. 2.

(2) Preparation of Polycarbonate Resin 620 g of water, 112.61 g of BPA, 11.27 g of the 1,4-phenylene bis(3-hydroxybenzoate) oligomer prepared in (1) above, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA and the 1,4-phenylene bis(3-hydroxybenzoate) oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13.

A resulting mixture was left alone for a while to fully carry out a reaction, after which HCl was added thereto to finish the reaction, such that the pH was dropped to 3-4. Then, agitation was stopped, after which a polymer layer and a water layer were separated from each other, such that a rinsing process was performed repeatedly three to five times by removing the water layer therefrom and adding thereto pure H$_2$O again.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 45,000 g/mol. As a result of NMR analysis, it was identified that the repeating unit derived from the 1,4-phenylene bis(3-hydroxybenzoate) oligomer is included in an amount of 10 wt % based on a total weight of the repeating units.

Example 4

A polycarbonate was prepared in the same manner as in Example 3, except that 5.7 g of 1,4-phenylene bis(3-hydroxybenzoate) oligomer and 114.51 g of BPA were used.

As a result of NMR analysis, it was identified that the repeating unit derived from the 1,4-phenylene bis(3-hydroxybenzoate) oligomer is included in an amount of 30 wt % based on a total weight of the repeating units.

Example 5

(1) Preparation of BPA 3-HB (propane-2,2-diylbis (4,1-phenylene) bis(3-hydroxybenzoate) Oligomer)

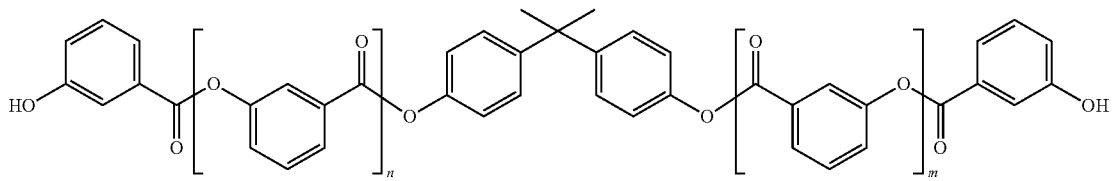

10.37 g of BPA was added dropwise to 200 ml of methylene chloride solvent in a round flask, after which 25.1 g of 1,3-hydroxybenzoic acid was added dropwise thereto. Thereafter, 23 g of oxalyl chloride and 0.01 g of DMF were added dropwise thereto at room temperature, and stirred at room temperature for about 4 hours. The solvent was removed using a rotary evaporator under reduced pressure to obtain a propane-2,2-diylbis(4,1-phenylene) bis(3-hydroxybenzoate) oligomer.

In addition, the obtained propane-2,2-diylbis(4,1-phenylene) bis(3-hydroxybenzoate) oligomer was subjected to an acid-base work-up process using 1N NaOH, 1N HCl aqueous solution, and methylene chloride solvent, and then a propane-2,2-diylbis(4,1-phenylene) bis(3-hydroxybenzoate) oligomer (weight average molecular weight: 1,000 g/mol) was obtained with a crude yield of 95% without any other purification.

Figure 3:
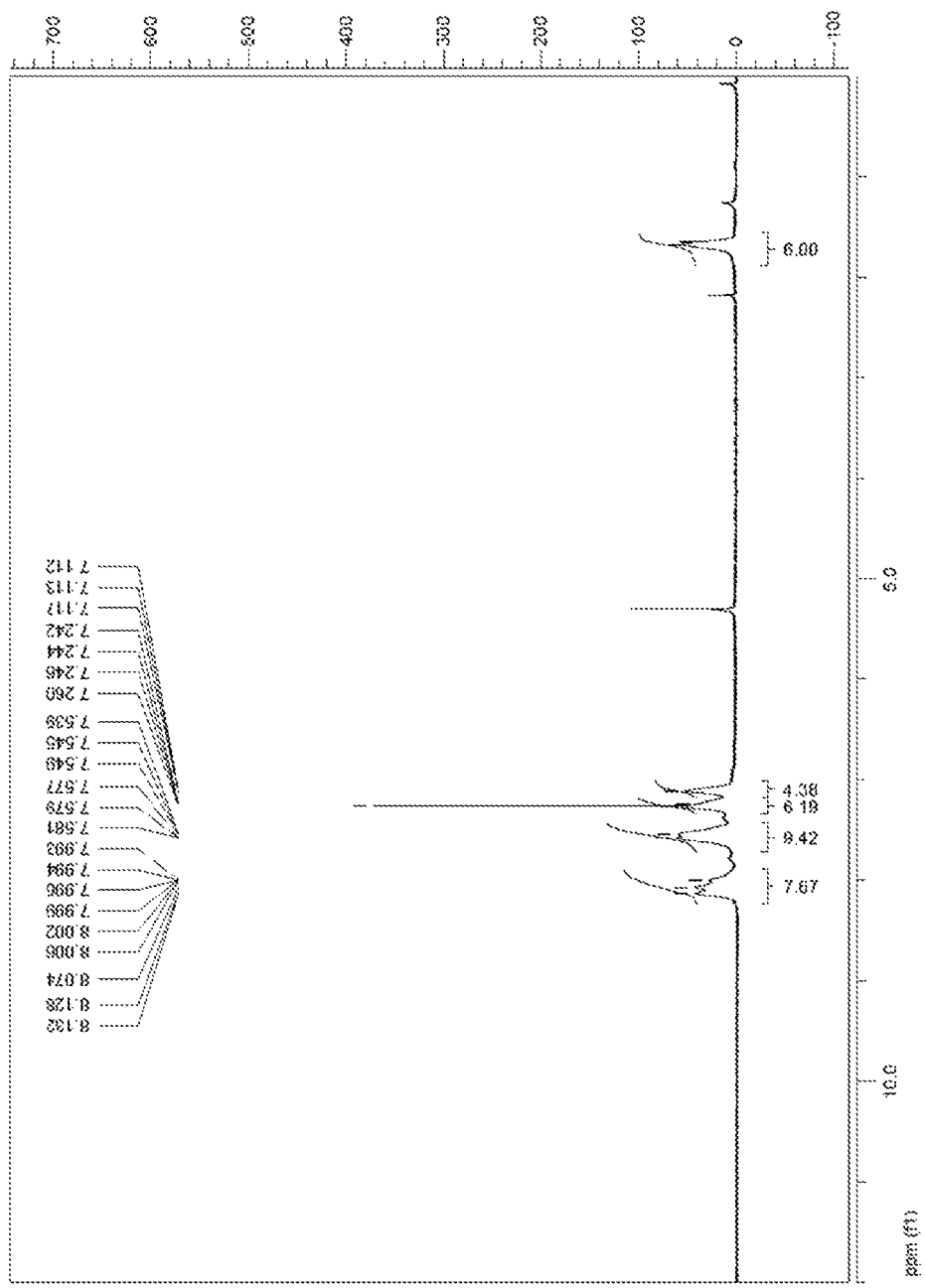
FIG. 3 is a $^1$H-NMR graph of the compound prepared in Example 5.

$^1$H NMR (in CDCl$_3$) analysis was performed on the obtained propane-2,2-diylbis(4,1-phenylene) bis(3-hydroxybenzoate) oligomer, and the result is shown in FIG. 3.

(2) Preparation of Polycarbonate Resin 620 g of water, 113.21 g of BPA, 12.3 g of the propane-2,2-diylbis(4,1-phenylene) bis(3-hydroxybenzoate) oligomer prepared in (1) above, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA and the propane-2,2-diylbis(4,1-phenylene) bis(3-hydroxybenzoate) oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13.

A resulting mixture was left alone for a while to fully carry out a reaction, after which HCl was added thereto to finish the reaction, such that the pH was dropped to 3-4. Then, agitation was stopped, after which a polymer layer and a water layer were separated from each other, such that a rinsing process was performed repeatedly three to five times by removing the water layer therefrom and adding thereto pure $H_2O$ again.

When rinsing was completely done, only the polymer layer was extracted therefrom, after which a polymer crystal was obtained via reprecipitation by using non-solvents such as methanol, $H_2O$, etc. At this time, a weight average molecular weight of the polycarbonate prepared was 49,000 g/mol. As a result of NMR analysis, it was identified that the repeating unit derived from the propane-2,2-diylbis(4,1-phenylene) bis(3-hydroxybenzoate) oligomer is included in an amount of 10 wt % based on a total weight of the repeating units.

Example 6

(1) Preparation of resorcinol 4-HB (1,3-phenylene bis(4-hydroxybenzoate) Oligomer)

5 g of resorcinol was added dropwise to 200 ml of methylene chloride solvent in a round flask, after which 25.1 g of 1,3-hydroxybenzoic acid was added dropwise thereto. Thereafter, 23 g of oxalyl chloride and 0.01 g of DMF were added dropwise thereto at room temperature, and stirred at room temperature for about 4 hours. The solvent was removed using a rotary evaporator under reduced pressure to obtain a 1,3-phenylene bis(4-hydroxybenzoate) oligomer.

In addition, the obtained 1,3-phenylene bis(4-hydroxybenzoate) oligomer was subjected to an acid-base work-up process using 1N NaOH, 1N HCl aqueous solution, and methylene chloride solvent, and then a 1,3-phenylene bis(3-hydroxybenzoate) oligomer (weight average molecular weight: 950 g/mol) was obtained with a crude yield of 96% without any other purification.

Figure 4:
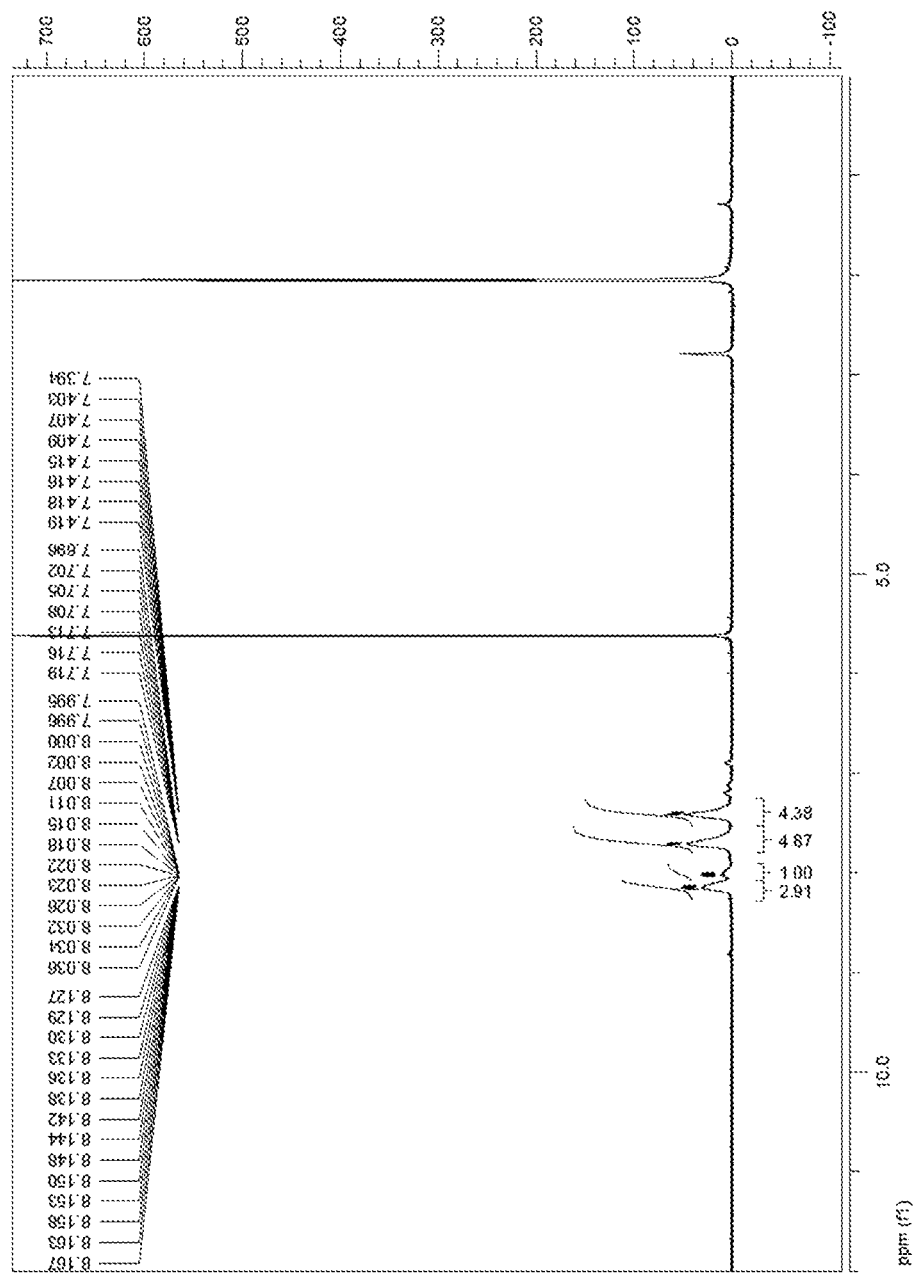
FIG. 4 is a $^1$H-NMR graph of the compound prepared in Example 6.

$^1$H NMR (in Acetone-d6) analysis was performed on the obtained 1,3-phenylene bis(4-hydroxybenzoate) oligomer (n+m=8), and the result is shown in FIG. 4.

(2) Preparation of Polycarbonate Resin 620 g of water, 112.61 g of BPA, 11.27 g of the 1,3-phenylene bis(4-hydroxybenzoate) oligomer prepared in (1) above, 102.5 g of 40 wt % NaOH aqueous solution, and 200 ml of $MeCl_2$ were put into a 2 L main reactor which is equipped with a nitrogen purge and a condenser and kept at room temperature with a circulator, and then stirred for minutes.

After stopping nitrogen purging, 62 g of triphosgene and 120 g of $MeCl_2$ were put into a 1 L round-bottom flask to dissolve triphosgene therein, after which a resulting dissolved triphosgene solution was slowly put into the main reactor, in which BPA and the 1,3-phenylene bis(4-hydroxybenzoate) oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13.

A resulting mixture was left alone for a while to fully carry out a reaction, after which HCl was added thereto to finish the reaction, such that the pH was dropped to 3-4. Then, agitation was stopped, after which a polymer layer and a water layer were separated from each other, such that a rinsing process was performed repeatedly three to five times by removing the water layer therefrom and adding thereto pure $H_2O$ again.

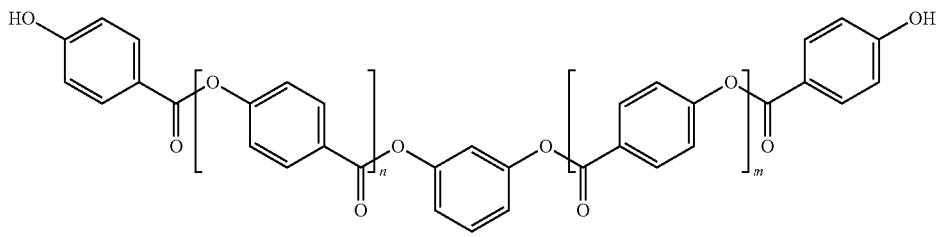

When rinsing was completely done, only the polymer layer was extracted therefrom, after which a polymer crystal was obtained via reprecipitation by using non-solvents such as methanol, $H_2O$, etc. At this time, a weight average molecular weight of the polycarbonate prepared was 46,000 g/mol. As a result of NMR analysis, it was identified that the repeating unit derived from the 1,3-phenylene bis(4-hydroxybenzoate) oligomer is included in an amount of 10 wt % based on a total weight of the repeating units.

Example 7

A polycarbonate was prepared in the same manner as in Example 6, except that 5.7 g of 1,3-phenylene bis(4-hydroxybenzoate) oligomer and 114.51 g of BPA were used. As a result of NMR analysis, it was identified that the repeating unit derived from the 1,3-phenylene bis(4-hydroxybenzoate) oligomer is included in an amount of 30 wt % based on a total weight of the repeating units.

Example 8

(1) Preparation of hydroquinone 4-HB (1,4-phenylene bis(4-hydroxybenzoate) Oligomer)

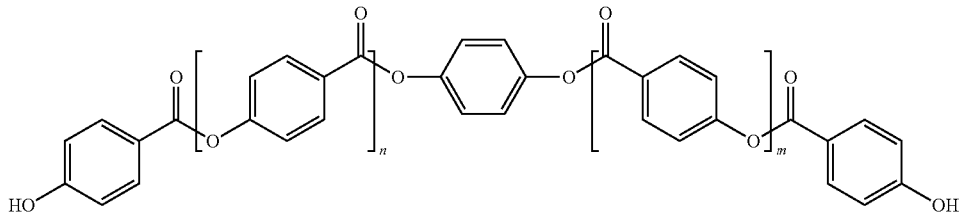

5 g of hydroquinone was added dropwise to 200 ml of methylene chloride solvent in a round flask, after which 25.1 g of 1,4-hydroxybenzoic acid was added dropwise thereto. Thereafter, 23 g of oxalyl chloride and 0.01 g of DMF were added dropwise thereto at room temperature, and stirred at room temperature for about 4 hours. The solvent was removed using a rotary evaporator under reduced pressure to obtain a 1,4-phenylene bis(4-hydroxybenzoate) oligomer.

In addition, the obtained 1,4-phenylene bis(4-hydroxybenzoate) oligomer was subjected to an acid-base work-up process using 1N NaOH, 1N HCl aqueous solution, and methylene chloride solvent, and then a 1,4-phenylene bis(4-hydroxybenzoate) oligomer (weight average molecular weight: 820 g/mol) was obtained with a crude yield of 98% without any other purification.

Figure 5:
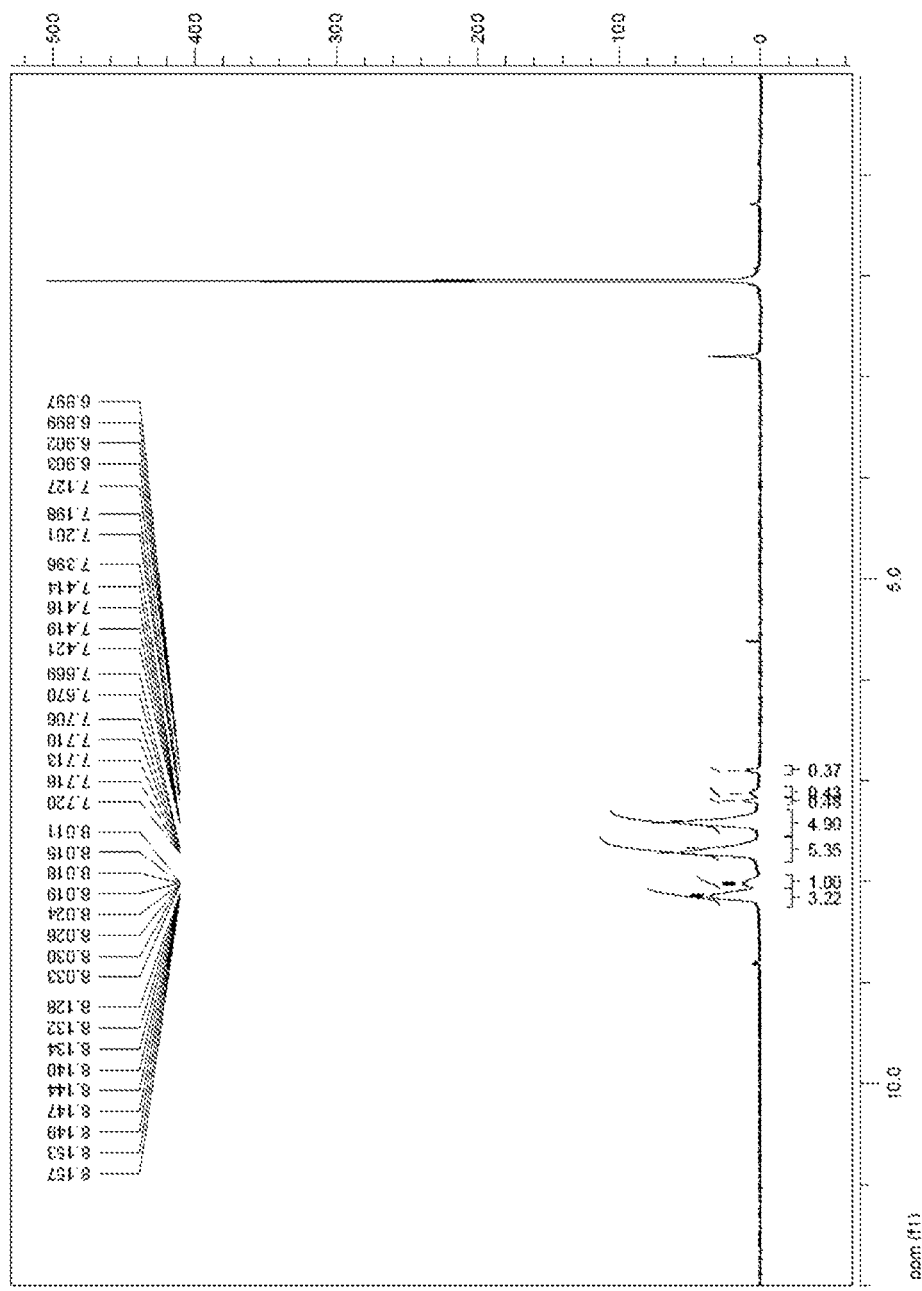
FIG. 5 is a $^1$H-NMR graph of the compound prepared in Example 8.

$^1$H NMR (in CDCl$_3$) analysis was performed on the obtained 1,4-phenylene bis(4-hydroxybenzoate) oligomer (n+m=7), and the result is shown in FIG. 5.

(2) Preparation of Polycarbonate Resin 620 g of water, 112.61 g of BPA, 11.27 g of the 1,4-phenylene bis(4-hydroxybenzoate) oligomer prepared in (1) above, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for 45 minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA and the 1,4-phenylene bis(4-hydroxybenzoate) oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13.

A resulting mixture was left alone for a while to fully carry out a reaction, after which HCl was added thereto to finish the reaction, such that the pH was dropped to 3-4.

Then, agitation was stopped, after which a polymer layer and a water layer were separated from each other, such that a rinsing process was performed repeatedly three to five times by removing the water layer therefrom and adding thereto pure H$_2$O again.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 48,000 g/mol. As a result of NMR analysis, it was identified that the repeating unit derived from the 1,4-phenylene bis(4-hydroxybenzoate) oligomer is included in an amount of 10 wt % based on a total weight of the repeating units.

Example 9

A polycarbonate was prepared in the same manner as in Example 8, except that 5.7 g of 1,4-phenylene bis(4-hydroxybenzoate) oligomer and 114.51 g of BPA were used. As a result of NMR analysis, it was identified that the repeating unit derived from the 1,4-phenylene bis(4-hydroxybenzoate) oligomer is included in an amount of 30 wt % based on a total weight of the repeating units.

Example 10

(1) Preparation of BPA 4-HB (propane-2,2-diylbis (4,1-phenylene) bis(4-hydroxybenzoate) Oligomer)

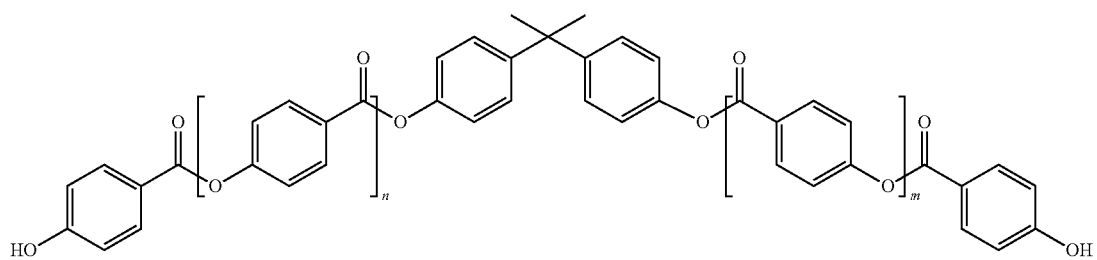

10.37 g of BPA was added dropwise to 200 ml of methylene chloride solvent in a round flask, after which 25.1 g of 1,3-hydroxybenzoic was added dropwise thereto. Thereafter, 23 g of oxalyl chloride and 0.01 g of DMF were added dropwise thereto at room temperature, and stirred at room temperature for about 4 hours. The solvent was removed using a rotary evaporator under reduced pressure to obtain a propane-2,2-diylbis(4,1-phenylene) bis(4-hydroxybenzoate) oligomer.

In addition, the obtained propane-2,2-diylbis(4,1-phenylene) bis(4-hydroxybenzoate) oligomer was subjected to an acid-base work-up process using 1N NaOH, 1N HCl aqueous solution, and methylene chloride solvent, and then a propane-2,2-diylbis(4,1-phenylene) bis(4-hydroxybenzoate) oligomer (weight average molecular weight: 980 g/mol) was obtained with a crude yield of 95% without any other purification.

Figure 6:
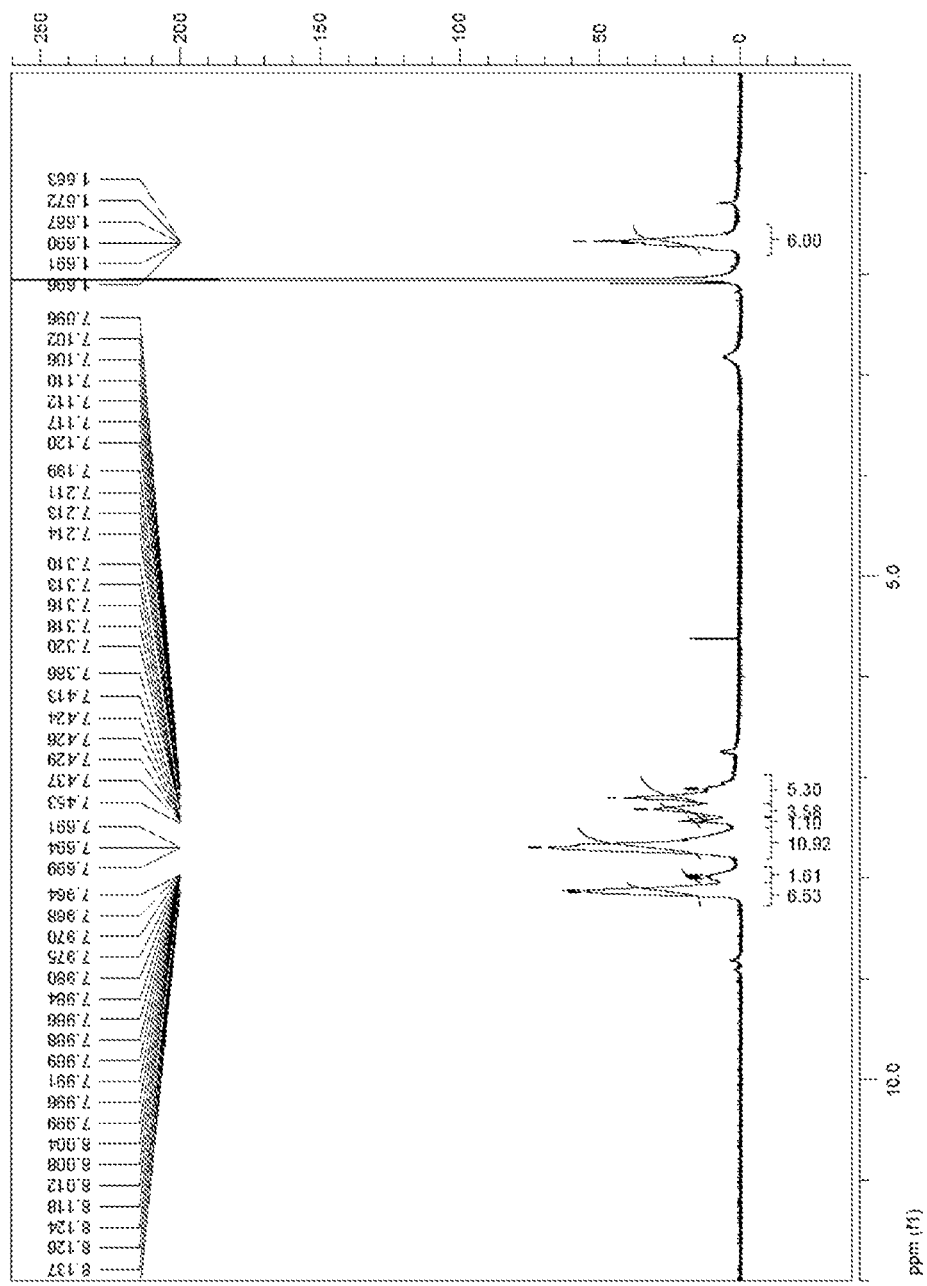
FIG. 6 is a $^1$H-NMR graph of the compound prepared in Example 10.

$^1$H NMR (in Acetone-d6) analysis was performed on the obtained propane-2,2-diylbis(4,1-phenylene) bis(4-hydroxybenzoate) oligomer (n+m=7), and the result is shown in FIG. 6.

(2) Preparation of Polycarbonate Resin 620 g of water, 113.21 g of BPA, 12.3 g of the propane-2,2-diylbis(4,1-phenylene) bis(4-hydroxybenzoate) oligomer prepared in (1) above, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA and the propane-2,2-diylbis(4,1-phenylene) bis(4-hydroxybenzoate) oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13. A resulting mixture was left alone for a while to fully carry out a reaction, after which HCl was added thereto to finish the reaction, such that the pH was dropped to 3-4. Then, agitation was stopped, after which a polymer layer and a water layer were separated from each other, such that a rinsing process was performed repeatedly three to five times by removing the water layer therefrom and adding thereto pure H$_2$O again.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 46,000 g/mol. As a result of NMR analysis, it was identified that the repeating unit derived from the propane-2,2-diylbis(4,1-phenylene) bis(4-hydroxybenzoate) oligomer is included in an amount of 10 wt % based on a total weight of the repeating units.

Comparative Example 1

620 g of water, 116 g of BPA, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, a reaction pH was maintained at 11-13. A resulting mixture was left alone for a while to fully carry out a reaction, after which HCl was added thereto to finish the reaction, such that the pH was dropped to 3-4.

Then, agitation was stopped, after which a polymer layer and a water layer were separated from each other, such that a rinsing process was repeatedly performed three to five times by removing the water layer therefrom and adding thereto pure H$_2$O again.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 46,300 g/mol.

Comparative Example 2

(1) Preparation of 3-((3-hydroxyphenoxy)carbonyl)benzoic Acid Oligomer

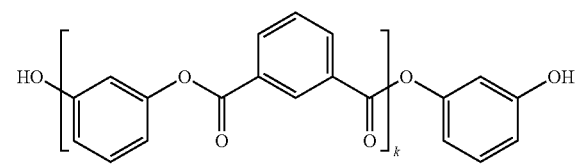

5.1 g of resorcinol was added dropwise to 200 ml of methylene chloride solvent in a round flask, after which 200 g or water, 3.7 g of NaOH and 0.01 g of tetrabutylammonium bisulfate were added dropwise thereto. Thereafter, 5.9 g of terephthaloyl chloride was added dropwise thereto at room temperature, and stirred at room temperature for about 4 hours to obtain a 3-((3-hydroxyphenoxy)carbonyl)benzoic acid oligomer. The synthesized oligomer was added in the preparation of a polycarbonate without any separate separation process.

(2) Preparation of Polycarbonate Resin 620 g of water, 115.077 g of BPA, 3-((3-hydroxyphenoxy)carbonyl)benzoic acid oligomer solution prepared in (1) above, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA and the 3-((3-hydroxyphenoxy)carbonyl)benzoic acid oligomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13.

A resulting mixture was left alone for a while to fully carry out a reaction, after which HCl was added thereto to finish the reaction, such that the pH was dropped to 3-4. Then, agitation was stopped, after which a polymer layer and a water layer were separated from each other, such that a rinsing process was performed repeatedly three to five times by removing the water layer therefrom and adding pure H$_2$O theretoagain.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 46,000 g/mol. As a result of NMR analysis, it was identified that the repeating unit derived from the 3-((3-hydroxyphenoxy)carbonyl)benzoic acid oligomer is included in an amount of 10 wt % based on a total weight of the repeating units.

Comparative Example 3

620 g of water, 108.9 g of BPA, 11.38 g of 1,4-phenylene bis(4-hydroxybenzoate) monomer, 102.5 g of 40 wt % NaOH aqueous solution, and 200 ml of MeCl$_2$ were put into a 2 L main reactor which is equipped with a nitrogen purge and a condenser and kept at room temperature with a circulator, and then stirred for minutes.

After stopping nitrogen purging, 62 g of triphosgene and 120 g of MeCl$_2$ were put into a 1 L round-bottom flask to dissolve triphosgene therein, after which a resulting dissolved triphosgene solution was slowly put into the main reactor, in which BPA and the 1,4-phenylene bis(4-hydroxybenzoate) monomer solution had been dissolved. After such input was completed, 2.66 g of PTBP (p-tert-butylphenol) was added thereto and stirred for about 10 minutes. Such agitation was completed, after which 97 g of 40 wt % NaOH aqueous solution was added thereto, and 1.16 g of TEA was added thereto as a coupling agent. At this time, the reaction pH was maintained at 11-13.

A resulting mixture was left alone for a while to fully carry out a reaction, after which HCl was added thereto to finish the reaction, such that the pH was dropped to 3-4.

Then, agitation was stopped, after which a polymer layer and a water layer were separated from each other, such that a rinsing process was performed repeatedly three to five times by removing the water layer therefrom and adding thereto pure H$_2$O again. When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 48,000 g/mol.

EXPERIMENTAL EXAMPLES

Evaluation of Physical Properties of Polycarbonate

The characteristics of injection-molded specimens of polycarbonates prepared in Examples and Comparative Examples above were measured by means of the following method, and the results thereof are shown in Table 1.

Weight average molecular weight (g/mol): 200 mg of polymer resin was diluted in 200 ml of tetrahydrofuran (THF) solvent to manufacture a sample of about 1000 ppm. Then, a molecular weight thereof was measured with an RI detector at 1 ml/min flow by using Agilent 1200 series GPC equipment. With regard to criteria for calculating a molecular weight of the sample, a calibration curve was drawn up by measuring eight PS standards, after which the molecular weight of the sample was calculated accordingly.

Flowability (MI): Measured in accordance with ASTM D1238 (300° C., 1.2 kg condition).

Weather resistance index (ΔE): Measured for a specimen with a thickness of ⅛ inch by measuring L, a, and b values of the specimen in accordance with ASTM D7869 and measuring L', a' and b' values again after leaving the specimen in 2250 hr weathering condition with Weather-Ometer® machine. From the results, the weather resistance index (ΔE) was calculated according to the following Equation 1.

$$\Delta E = \sqrt{((L'-L)^2 + (a'-a)^2 + (b-b)^2)}$$  Equation 1

TABLE 1

| | Type and weight ratio of repeating unit of Chemical Formula 1 | Mw (g/mol) | MI (g/10 min) | Weather resistance index (ΔE) |
|---|---|---|---|---|
| Example 1 | Resorcinol 3-HB oligomer, 10 wt % | 46,000 | 15.4 | 4.5 |
| Example 2 | Resorcinol 3-HB oligomer, 30 wt % | 45,000 | 15.9 | 7.5 |
| Example 3 | Hydroquinone 3-HB oligomer, 10 wt % | 45,000 | 16.1 | 4.6 |
| Example 4 | Hydroquinone 3-HB oligomer, 30 wt % | 44,000 | 18 | 7.9 |
| Example 5 | BPA 3-HB oligomer, 10 wt % | 49,000 | 11.6 | 4.5 |
| Example 6 | Resorcinol 4-HB oligomer, 10 wt % | 46,000 | 15 | 5.3 |
| Example 7 | Resorcinol 4-HB oligomer, 30 wt % | 45,000 | 16.7 | 8.3 |
| Example 8 | Hydroquinone 4-HB oligomer, 10 wt % | 48,000 | 13.3 | 5.1 |
| Example 9 | Hydroquinone 4-HB oligomer, 30 wt % | 46,000 | 14.9 | 4.9 |
| Example 10 | BPA 4-HB oligomer, 10 wt % | 47,000 | 13 | 4.8 |
| Comparative Example 1 | — | 46,000 | 11.8 | 31 |
| Comparative Example 2 | 3-((3-hydroxyphenoxy) carbonyl)benzoic acid oligomer*, 10 wt % | 48,000 | 10.3 | 17 |
| Comparative Example 3 | Hydroquinone 4-HB monomer*, 10 wt % | 48,000 | 11 | 24.5 |

(*In Comparative Examples 2 and 3, the kind of a repeating unit corresponding to a repeating unit of Chemical Formula 1 was described.)

With reference to the above Table 1, in case of all the Examples including the repeating unit of the present disclosure, weather resistance and flowability were significantly improved than the general BPA polycarbonate of the Comparative Example 1 or polycarbonates of the Comparative Examples 2 to 3. In particular, an effect of improving weather resistance was highest when the repeating unit of the Chemical Formula 1 was included in an amount of about 10 wt %.

The invention claimed is:

1. A polycarbonate, comprising a repeating unit of the following Chemical Formula 1:

Chemical Formula 1

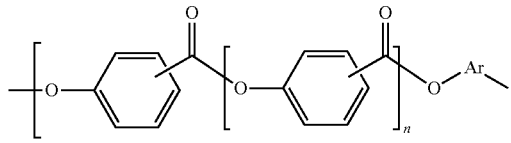

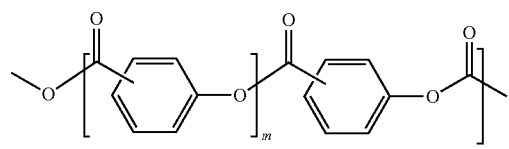

wherein in Chemical Formula 1:
Ar is $C_{6-60}$ arylene unsubstituted or substituted with $C_{1-10}$ alkyl; and
n and m are each independently an integer from 1 to 50, provided that n+m is 2 or more.

2. The polycarbonate of claim 1, wherein the repeating unit of Chemical Formula 1 has a structure of one of the following Chemical Formulae 1a to 1c:

wherein in Chemical Formulae 1a to 1c, n and m are each independently an integer from 1 to 50, provided that n+m is 2 or more.

3. The polycarbonate of claim 1, further comprising a repeating unit of the following Chemical Formula 2:

Chemical Formula 2

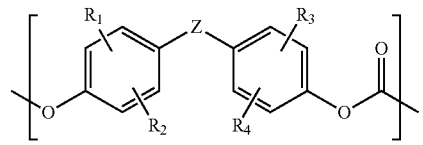

wherein in Chemical Formula 2:
$R_1$ to $R_4$ are each independently hydrogen, $C_{1-10}$ alkyl, $C_{1-10}$ alkoxy, or halogen; and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

4. The polycarbonate of claim 3, wherein $R_1$ to $R_4$ are each independently hydrogen or $C_{1-4}$ alkyl.

5. The polycarbonate of claim 3, wherein a weight ratio of the repeating unit of Chemical Formula 1 and the repeating unit of Chemical Formula 2 is 5:95 to 40:60.

6. The polycarbonate of claim 1, wherein a weather resistance index (ΔE) calculated according to the following Chemical Formula 1a

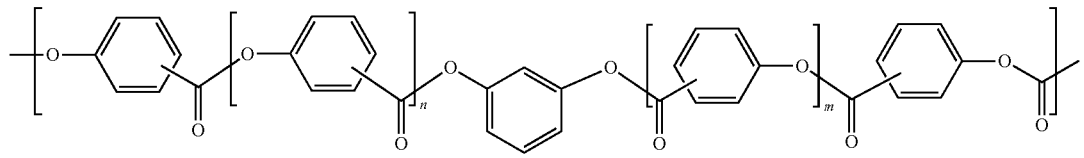

Chemical Formula 1b

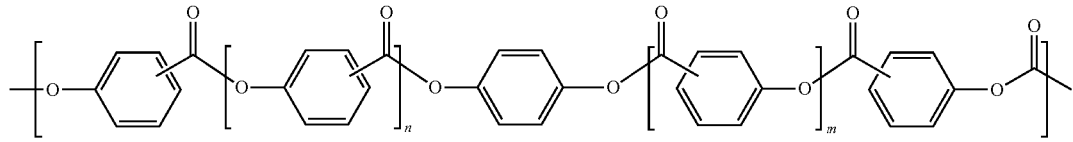

Chemical Formula 1c

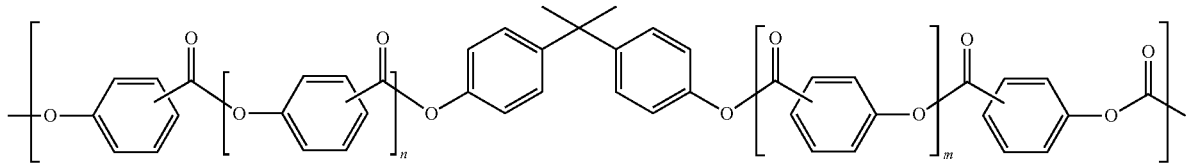

Equation 1 is 1 to 15, and a melt index measured in accordance with ASTM D1238 (300° C., 1.2 kg condition) is 8 to 120 g/10 min:

$$\Delta E = \sqrt{((L'-L)^2 + (a'-a)^2 + (b'-b)^2)} \quad \text{Equation 1}$$

wherein in Equation 1, L, a and b are measured for a specimen with a thickness of ⅛ inch in accordance with ASTM D7869, and L', a' and b' are measured after leaving the specimen in 2250 hr weathering condition.

7. A method of preparing the polycarbonate of claim 1, comprising polymerizing a composition containing a compound of the following Chemical Formula 3 and a carbonate precursor:

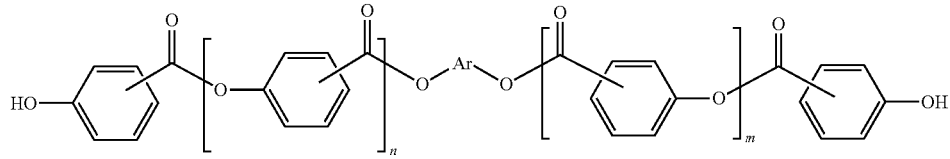

Chemical Formula 3 wherein in Chemical Formula 3:
Ar is $C_{6-60}$ arylene unsubstituted or substituted with $C_{1-10}$ alkyl; and
n and m are each independently an integer from 1 to 50, provided that n+m is 2 or more.

8. The method of claim 7, wherein the compound of Chemical Formula 3 has a structure of one of the following Chemical Formulae 3a to 3c:

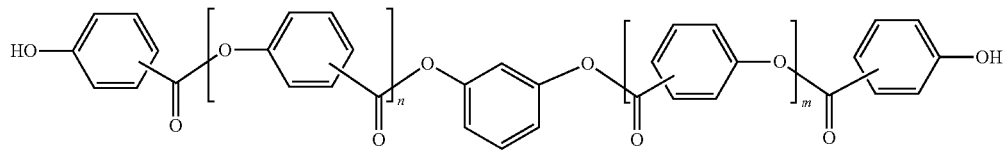

Chemical Formula 3a

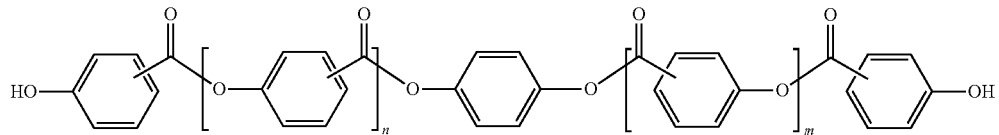

Chemical Formula 3b

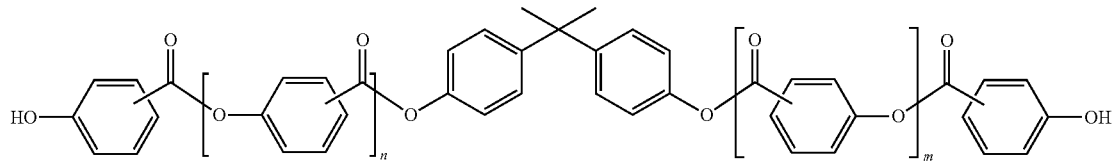

Chemical Formula 3c wherein in Chemical Formulae 3a to 3c, n and m are each independently an integer from 1 to 50, provided that n+m is 2 or more.

9. The method of claim 7, wherein the composition further contains an aromatic diol compound of the following Chemical Formula 4:

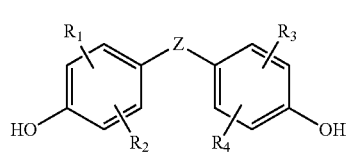

Chemical Formula 4 wherein in Chemical Formula 4:
$R_1$ to $R_4$ are each independently hydrogen, $C_{1-10}$ alkyl, $C_{1-10}$ alkoxy, or halogen; and
Z is a $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

10. The method of claim 9, wherein the aromatic diol compound of Chemical Formula 4 is selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, and 1,1-bis(4-hydroxyphenyl)-1-phenylethane.

11. A molded article, comprising the polycarbonate of claim 1.

* * * * *